July 23, 1963 R. J. CALLENDER 3,098,897

UNITARY TELEVISION EQUIPMENT

Filed Sept. 10, 1959

INVENTOR.
RUSSELL J. CALLENDER
BY
Alton V. Oberholtzer 3,098,897

UNITARY TELEVISION EQUIPMENT

Russell J. Callender, 115 Wildwood Beach, Mahtomedi, Minn.

Filed Sept. 10, 1959, Ser. No. 839,212
6 Claims. (Cl. 178—7.9)

This invention and improvement in the television and radar art is a continuation in part of my pending application Serial Number 332,233 and a further novel improvement in design and arrangement of physical positioning of chassis and cabinet structure relative to mounting, receiving, apparatus component elements, and a cathode ray tube in a highly refined receiver system. More particularly, the improved structure relates to a chassis and cabinet arrangement with the substantial physical positioning of the receiving tubes and circuit components within a visible and readily accessible area no larger than the physical dimension of the picture projection screen at the viewing end of a cathode ray tube.

The problem facing the reception of televised and received images in viewable, relatively light cabinet structure has been to simplify access to component elements and at the same time provide economical cabinet structure of light weight. The prior cabinet and receiver structures have generally provided horizontal and vertical mounting chassis requiring mounting of the receiving components in complicated arrangements difficult to dismantle. Otherwise, such structures required large enclosures, or cabinet sizes, out of proportion to the utilized picture projection area at the viewing end of a cathode ray tube. There is also provided other structure shown in the recently issued Patents 2,896,200–2,896,201 and 2,896,199 to Avco Manufacturing Corporation, showing a different arrangement disclosed and embodied in my indicated prior pending application. The structures provided in these patents afford essentially the cabinet arrangement with the open chassis and vertical apertured mounting panel, fundamentally embodied in my aforesaid pending application. The single horizontal base of the chassis forms the support for the cabinet walls, cathode ray tube and component parts mounting. In forming the cabinet structure of light metal, there is further need for supporting and strengthening the walls in conjunction with facilitating access to component elements and circulation of cooling air throughout the interior of the cabinet. Another desirable feature is to provide visibility and access to the small tube and component elements simply upon removal of the cover thereof, without dismantling the cabinet.

Accordingly an object of this improvement is to provide strong, light-weight, low cost cabinet and chassis superstructure with an improved, ventilated arrangement of component elements placed in a turret relationship or 360 degrees around the stem of a cathode tube with the chassis for the small tubes turned about 90 degrees from the relatively vertical position of the projection screen and placed substantially within the physical and linear dimensions of the picture screen.

Another object of this improvement is to provide a chassis superstructure for mounting an annular rim of small tube and component receiving elements mounted about a cathode ray tube stem with the rim in substantially parallel alignment with the plane of the said stem and the longitudinal axis of the components protruding therefrom, within the confines of an area no larger than the rearward projection area of the picture viewing screen.

An additional object of this improvement is to provide a television receiving cabinet and chassis superstructure frame for mounting a cathode ray tube in a supporting band therefor fastened to the cabinet interior in at least three equal distant places to support the cathode ray tube in fixed position and also hold the cabinet superstructure in rigid position from the display end of the cabinet.

A further object of this improvement is to provide an improved, strong, light-weight cabinet shell structure for a cathode ray tube mounted in a chassis superstructure, providing ready access and visibility to the equipment components in manufacturing, assembly, testing and replacement of component elements.

An additional and further object is to provide an improved, ventilated chassis and cabinet structure arrangement for mounting a picture tube and its component parts in a readily visible and available position upon removal of a cover from the chassis and cabinet which is substantially no larger than the picture projection area and the cabinet is relatively no deeper than the stem of the picture tube. That is, for example, a 110 degree picture tube is about 11⅝ inches in depth for a 17 inch picture and this arrangement provides for the back of the cabinet being relatively and substantially no deeper than the stem of the picture tube, with the component tube elements all mounted substantially within the linear cross-section area of the picture projection area and yet readily visible and accessible without dismantling the cabinet and chassis.

Additional objects and advantages will be apparent from the following description of the accompaying drawings wherein.

In the following description, it is recognized that the principles of electronics, circuits, controls and their interrelationship of operability are known to the art. Further, it will be recognized that in the present arrangement, I optionally utilize the inside of the chassis at the A.C. electrical current voltage of the line supply and the outside cabinet cover at an insulated electrical voltage relationship.

Figure 2:
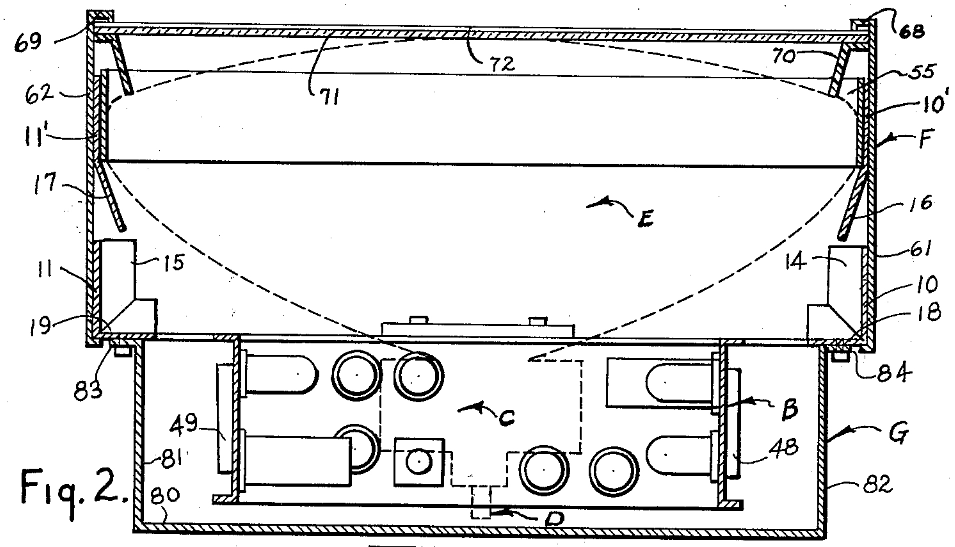
FIG. 2 is a cross-sectional view through my improved cabinet and chassis superstructure as herein described, with the top wall portions of the cabinet shell, chassis superstructure and ventilating cover removed and on the lines 1—1 of FIGURE 1.
Figure 1:
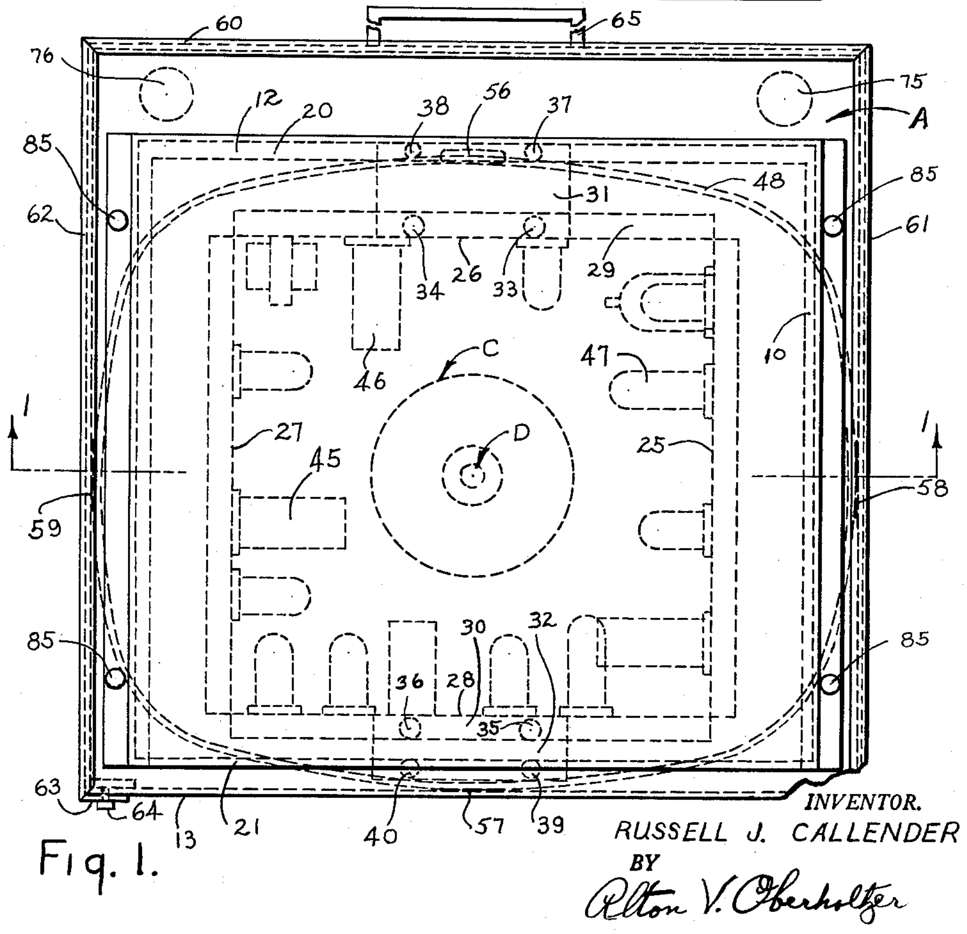
FIG. 1 is a rear view of my improved cabinet and chassis superstructure arrangement showing the cabinet shell mounted over the chassis superstructure and readily removable ventilating cover.

By correlating the views shown in FIGURES 1 and 2, it will be recognized that there is illustrated a television receiver cabinet structure comprising a substantially rectangular superstructure frame A having a floating component parts mounting chassis frame B. The mounting rim frame B circumferentially surrounds a conventional magnetic or electrostatic beam deflection means C mounted over the stem D of the cathode ray tube E. The chassis frame B illustratively positions component elements in a relative turretlike circular rim arrangement 360 degrees around the stem D of tube E which is illustratively shown in dotted lines. The rim is preferably in substantially parallel plane with tube stem and positions the small tubes and component elements within an area no larger than the physical and linear dimension of the picture projection area, or screen view area, of the cathode ray tube E. A cabinet shell F covers the chassis frame A, and a readily removable back ventilator cover G is fastened to the back of the chassis A, as hereinafter described in more detail. It will be generally recognized that the arrangement provides for mounting the component tube and circuit elements of the receiver unit in a readily visible and accessible location about the axis of the cathode tube stem D in the relative relationship of encirclement by a rim in the manner of a wheel rim encircling a hub, with the small tubes and their associated electronic components mounted on the inner and outer surfaces of the rim and substantially within the physical and linear dimension of the picture projection area of the cathode tube screen.

The base frame of the superstructure A is formed of four side panels 10, 11, 12 and 13 formed of narrow gauge or thin sheet metal panels which are spot welded together to form the rectangular superstructure A. The side panels 10 and 11 are illustrative shown in FIGURE 1, provided with right angularly bent edges 14 and 15 respectively (one only of each being shown) for spot welding the top and bottom superstructure panels thereto. The mechanics of fastening the panels 10, 11, 12 and 13 into a frame forming the superstructure A by any such suitable and other means is recognizable and known to the art. About centrally of each of the panels 10, 11, 12 and 13, and substantially through the length thereof, there is provided a slit and the metal portions, represented by 16 and 17 (two only being shown), bent or tipped inwardly to serve as picture tube supports by making the panel sides rigid.

The frame A is open at the front and back, with the back edges of the panels 10, 11, 12 and 13 provided with right angularly turned flanges 18, 19, 20 and 21, respectively, for mounting the chassis frame B and rear cover G.

The chassis frame B is illustratively formed of a plurality of narrow panel members 25, 26, 27 and 28 with turned ends (not shown) spot welded in the manner illustrated for securing the panels of the said superstructure together. Each of the sides of the panels 26 and 28 are preferably provided with the turned flanges 29 and 30, respectively, for securing insulating blocks 31 and 32 thereto by suitable means as screws or bolts 33, 34 and 35, 36 respectively. The opposite edges of the insulating blocks 31 and 32 are also fastened by suitable means as screws or bolts 37, 38 and 39, 40, respectively to flanges 20 and 21. The insulating blocks 30 and 31 are of fiber or plastic and serve to resiliently support the chassis frame B in a relatively floating relationship outside the confines of the superstructure frame A and mounting components protruding from the frame within the relative area defined by the physical and linear dimension of the picture projection screen area at the enlarged display end of the cathode ray tube E. This rim is preferably flat but may be curved slightly to follow the contour of the picture tube aqueduct.

As illustrated in the drawings, the preferred arrangement is to mount the chassis frame B in a plane substantially parallel to the stem of the picture tube E. Thus the positioning of the component elements as represented by 45, 46, 47, 48 and 49 shows a readily available mounting arrangement therefor with clear visibility and easy access for construction, examination, replacement and repair. In addition, it will be recognized that this new and novel arrangement provides for simplicity and economy in manufacture of strong, light, metal or plastic television receiver cabinet structures.

In order to mount and support the cathode ray tube E in superstructure frame A, there is provided a metal band 55 adapted to be clamped by a conventional adjustable turn screw mechanism 56. The band 55 is spot welded at equal distant points to the superstructure frame A. As illustrated, the band 55 is spot welded at 57 in a centered relationship to the base panel 13, and at exactly equal distant points 58 and 59 of the side panel portions 10 and 11, respectively, of superstructure frame A. By this arrangement the band 55 when clamped securely about the tube E, firmly holds the relatively thin superstructure walls in rigid position. This affords a strong solid construction to the cabinet despite the thinness of the walls and their tendency to be flexed and rocked.

Over the superstructure frame A there is adapted to be mounted an open face cabinet shell F preferably serving as a carrying case or decorative cover adapted to mount and support a shield and protective glass covering in front of the picture viewing screen of cathode ray tube E. The shell F is a U-shaped metal frame having a base portion 60 and side leg portions 61 and 62. The outermost ends of the legs 61 and 62 are bent inwardly as illustrated at 63 (one only being shown at end of leg 62) and secured to the base panel 13 of the superstructure A for example, by screw bolts as illustrated at 64 or other suitable fastening element. The sides 61 and 62 are flexible for placing or displacement of the cabinet shell F about the outer periphery of the superstructure frame A. A handle 65 may be conventionally mounted on the shell F for convenience in carrying the entire assembly.

As indicated, the front portion of the cabinet shell F is open. The outer edges 68 and 69 of the sides 61 and 62 are bent inwardly to serve as mounting flanges or channels for supporting a conventional mask insert 70 and protective glass shield 71. The base 13 also has its outermost edge 72 turned up to form a flange or channel for holding the mask and shield in place. As shown in FIGURE 1, the top of the shell frame F is shown in spaced relationship to the superstructure frame A and serves to provide for a narrow mounting panel (not shown in detail) for control knobs 75 and 76 by which the reception of the receiver system is controlled in a conventional manner. The manner of attaching such controls to the component elements and their extension from the front, side or top of the cabinet, is a matter of choice and can be arranged as the maker desires.

This arrangement provides for a unitary cabinet structure with the tube and component parts mounted in a relationship that needs not be disturbed for visibility and accessibility to the relatively complex arrangement of component tubes, condensers, transformers, resistors, wiring and other of the receiver elements that most often require repair and replacement. The yoke C is supported in a conventional manner about the stem D of tube E and spaced from the replaceable relatively parallel component elements 45, 46, 47 and the like. This spacing provides room for manipulation of the component elements and for their removal and replacement without disturbance of any other of the structure, other than removal of cover G. In addition, the wiring arrangement for the component elements and other component parts, including the circuit system, as represented by 48 and 49 can be readily worked on without disturbance of any other portion of the receiver system. As shown, it is found to be most convenient in the present arrangement to position the chassis, for the mounting of component elements, in a relative parallel relationship to the tube stem D. However, it will be recognized that the chassis could be tilted at a slight angle or fashioned as a flat spiral ring and mounted about the tube stem D in any suitable receiver system cabinet structure.

The chassis and cabinet structure above described are representative of a portable or other television receiver structure encompassed as a whole unit which does not need dismantling for checking the small tube and component parts of the receiver system. The circuit system and its elements are readily visible and can be worked upon by merely turning the cabinet on the side desired. The covering G serves as an electrical shield enclosing the components. The cover G is a light U-shaped frame having a back side 80, the side portions 81 and 82 and with screened openings (not shown) at the top and bottom to provide for the free circulation of air therethrough and about the interior of the cabinet structure. The sides 81 and 82 are provided with integral flanges 83 and 84, respectively. Suitable screw or bolt means 85 mount the cover G to the flanges 19 and 18 of the superstructure frame A.

It will be recognized that what has been shown and described is the preferred embodiment of an economical television receiver system in strong reinforced cabinet structure of light weight and of the relative size and physical dimensions of the cathode ray tube. Here, I have accomplished a solution of the problem of finding room for making the components of relatively small picture projection areas readily accessible and available. The physical positioning of the cathode ray tube components is relatively no larger than the physical and linear dimension of the picture viewing screen. However, in view of the above illustration and description, it will be understood that various modifications and changes may be made without departing from the true scope of this improvement in the art as defined by the appended claims.

I claim:

1. In an electronic picture receiver system of the direct-view, enclosed cabinet model type, the combination of; a superstructure frame forming an open ended enclosure having top, bottom and side wall frame portions for mounting a cathode ray tube, a cathode ray tube including a frontal picture viewing screen having relatively rectangular physical and linear dimensions and a rearwardly extending stem portion; an encircling band secured at equal distant interior points to the wall frame portions of said superstructure, said band encircling the outside circumference of said tube about said picture viewing screen and adapted with the support of said encircled tube portion to rigidly secure said wall portions and support said tube; a small tube component mounting chassis supported by said superstructure and comprising a relatively flat plate surface encircling the stem end of said tube and in substantially parallel relationship thereto extending rearwardly of the wall frame portions of said superstructure frame for mounting receiving system small tubes, component elements and circuitry therefor of said receiver system in angularly spaced relationship about said tube stem externally of said superstructure and within the confines of the physical and linear area of said frontal picture viewing screen; an outer cabinet shell secured to and enclosing the top and side wall portions of said superstructure frame forwardly of said small tube component mounting chassis, and a removable back cover having perforated side walls enclosing said chassis, whereby when said cover is removed, the small tubes and other components including the circuitry therefor mounted on said chassis are freely visible and replaceable without disturbance of the said chassis and remainder of said cabinet structure.

2. The structure of claim 1, wherein the chassis mounting for the component parts of the cathode ray tube are in relatively freely exposed turret relationship about the stem of the cathode ray tube and extend beyond the limits of said outer cabinet shell.

3. The structure of claim 1, wherein a means for beam deflection extends about the stem of said tube and the small component parts for the cathode ray tube are exterior of the superstructure frame and arranged 360 degrees about said deflection means.

4. A portable television receiver structure comprising in combination superstructure frame open at the front and back, a covering enclosure shell for the sides of said frame open at the front and back, a cathode ray tube having a picture viewing screen end and a stem portion supported by said superstructure frame, a superstructure reinforcing band secured at equal distant points about the interior of said superstructure frame and encircling the said tube adjacent the open front ends of said frame and shell, a small tube receiver system component parts and wiring system therefor mounting chassis comprising an open ended rim mounted about said tube stem portion and secured to said superstructure frame, said chassis mounting extending beyond said superstructure frame and positioning the said small tube, receiver system component parts and wiring therefor in a relatively spaced parallel visible and exposed physical relationship about said tube stem and within the physical and linear dimensions of the picture viewing screen end of said tube, and a separable covering shell for enclosing said components removably mounted at the rear of said frame and having open top and bottom wall portions for providing free ventilation therethrough; whereby when the said separable covering is removed, the small tubes, receiver system component parts and wiring therefor are freely visible and replaceable without disturbance of the said chassis and remainder of said receiver structure.

5. In combination, in a television receiver system, a cathode ray tube having a picture projection area and a stem end, a relatively permanent cabinet portion enclosure for said picture projection area of said cathode ray tube, a removable perforated wall enclosure portion for said stem end, and a chassis frame for mounting small tubes the wiring therefor and circuitry component elements of said receiver system for said cathode ray tube; said chassis frame comprising a relatively open ended flat rim enclosed by said removable perforated wall enclosure and extending about said tube stem in substantially parallel relationship therewith, said chassis frame being adapted to support said small tubes and circuitry component elements with their longitudinal axes relatively positioned at an angle of 90 degrees to the axis of the said tube stem and with the said wiring extends thereabout substantially within the physical and linear dimensions of the picture projection area of said cathode ray tube exteriorly of the said relatively permanent cabinet portion and within the said removable wall enclosure portion thereby to position the said wiring, small tubes and circuitry component elements without the confines of said relatively permanent cabinet portion.

6. A television receiver structure comprising in combination a superstructure frame portion open at its relative front and back, relatively permanent cover enclosure walls about said superstructure and open at the relative front and back, a cathode ray tube having a picture viewing screen end enclosed by said cabinet walls and a stem end portion extending from an open end of said walls, a small tube component parts and receiver system circuitry mounting chassis secured to said superstructure, said chassis being mounted about said stem end externally of said superstructure and said enclosure walls thereabout and positioning small tube component elements and circuitry therefor in relatively open spaced relationship about said tube stem relatively wholly within the physical and linear dimensions of the said picture viewing screen end of said tube, and a perforated removable cover portion enclosing said chassis and said relatively open spaced tube component elements, whereby when said cover portion is removed the said small tubes and component elements including circuitry therefor are freely visible and replaceable without disturbance of the said chassis and remainder of said receiver structure and when said cover encloses said chassis, small tubes and component elements there is ready circulation of air about said chassis, small tubes and component parts including circuitry therefor externally of the remainder of said receiver structure.

References Cited in the file of this patent

UNITED STATES PATENTS

| | | |
|---|---|---|
| 2,896,201 | Ackerman | July 21, 1959 |
| 2,917,577 | Harman | Dec. 15, 1959 |
| 2,947,811 | Archer | Aug. 2, 1960 |
| 2,969,268 | Mason | Jan. 24, 1961 |

FOREIGN PATENTS

| | | |
|---|---|---|
| 773,321 | Great Britain | Apr. 24, 1957 |